Feb. 14, 1950 D. F. STARR 2,497,101

METHOD OF SPRAYING

Filed June 29, 1945

Inventor
DONALD F. STARR

By H. N. Foss
J. A. Siegrist
Attorney

Patented Feb. 14, 1950 2,497,101

UNITED STATES PATENT OFFICE 2,497,101

METHOD OF SPRAYING

Donald F. Starr, College Park, Md., dedicated to the free use of the People in the territory of the United States Application June 29, 1945, Serial No. 602,243

3 Claims. (Cl. 21—58)

(Granted under the act of March 3, 1883, as amended April 30, 1928; 370 O. G. 757)

1

This application is made under the act of March 3, 1883, as amended by the act of April 30, 1928, and the invention herein described, if patented, may be manufactured and used by or for the Government of the United States of America for governmental purposes without the payment to me of any royalty thereon.

I hereby dedicate the invention herein described to the free use of the People in the territory of the United States to take effect on the granting of a patent to me.

This invention relates to spraying, and in particular to a method of spraying certain insecticides and to an apparatus for effecting the method.

A mixture of dichlorodiphenyltrichloroethanes, known as technical DDT, or the purified 1-trichloro-2,2-bis(para-chlorophenyl) ethane, is a well-known insecticide. It is desirable in many instances to deposit this insecticide in the form of an aqueous spray.

DDT is, however, difficult to wet with water. It is quite insoluble, and to form a sprayable mixture with water, it is frequently dissolved in a solvent and an emulsion formed with the water. This requires the use of an emulsifier, and is defective in that the emulsifier increases the tendency of the DDT to be washed or weathered off of surfaces to which the spray has been applied.

Finely ground DDT is also suspended in water, but this requires the use of a solid diluent for the DDT or else a wetting agent to form a sprayable suspension. This is defective in that the diluent decreases the contact of the insect with the deposited insecticide or the wetting agent, like the emulsifier, increases the tendency of washing off the DDT.

DDT may be dissolved in a water miscible solvent and the solution mixed with water but there is a tendency for the precipitated DDT to settle out of the water, and the freshly precipitated DDT adheres to surfaces within the spray machinery, thus causing loss of DDT from the spray mixture and clogging of the spray nozzles. Also only low concentrations of the DDT in the solvents give suitable dispersions with the water.

The objects of this invention are to form a spray for deposit on a surface, of water and a material which is incompatible with water in the sense that it is insoluble and cannot be made into a suspension or emulsion therein without the use of emulsifiers, solid diluents or wetting agents, in a manner whereby the material is incorporated in the spray droplets, and no emulsifier, solid diluent or wetting agent is used; to

2 form a spray of such material and water by use of miscible solvents wherein the material is deposited as a nascent precipitate; and to produce an apparatus which is easily assembled from readily obtainable or constructed parts capable of forming the spray. Other objects will be apparent from the following specification, annexed drawing and claims.

In general, according to the invention, sprays of the water and of the incompatible material in the liquid state, or dissolved in a solvent, are independently formed and intermixed immediately prior to depositing. In the case of the use of a water immiscible solvent for the incompatible material, an unstable dispersion of the emulsion type is formed such that the immiscible solvent containing the incompatible material has less tendency to be carried away from the treated surface in the water run-off, thereby providing a method of producing heavier deposits than those obtained from more stable emulsion sprays containing emulsifiers. In the case of the use of a water miscible solvent the incompatible material is precipitated during the mixing of the two sprays and the incompatible material is applied to the treated surface in the form of a nascent precipitate which is more active and more adhesive than the usual form of the incompatible material. In either case, upon drying the material is deposited without the presence of any solid diluent, emulsifier or wetting agent.

Referring to the annexed drawing showing one form of apparatus suitable for effecting the spraying:

Figures 1, 2:
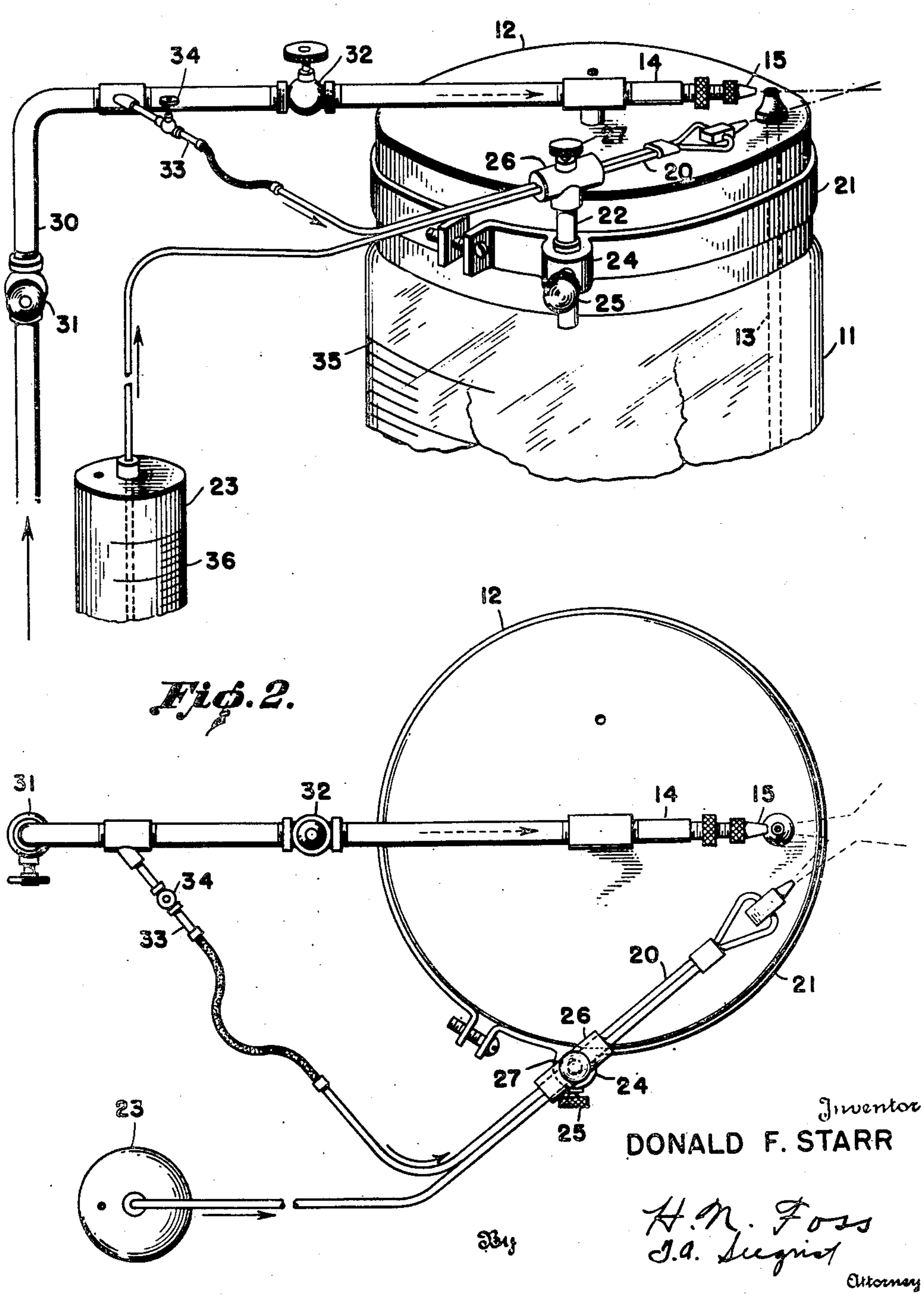
Figure 1 is a fragmentary three-dimensional view of the apparatus.
Figure 2 is a top plan view thereof.

The water is contained in a jar 11 fitted with a removable lid 12. A water spray-forming jet is composed of a water delivery tube 13 carried by the lid and projecting downwardly into the jar terminating near the bottom thereof, an air jet 14 with an adjustable tip 15 being also mounted on the lid in proper position for the air jet to effect withdrawal of the water through the delivery tube and form the water spray. The apparatus thus far described is of conventional design.

A second spray nozzle 20 for delivery of the incompatible material which is also of conventional design, being similar to the ordinary nasal spray, is also mounted on the lid by means of a clamp band 21 and a bracket 22. This spray nozzle communicates with the incompatible material container 23, and is made adjustable relative to the water spray-forming jet both as to the angle at which the two sprays intersect and as to the distance between the nozzle and jet. The angular adjustability is accomplished by pivotally mounting the bracket 22 in the band 21, as shown at 24, the set screw 25 being used to lock the bracket in any desired position of angularity. The distance adjustability is accomplished by slidingly mounting the spray nozzle 20 in the bracket, as shown at 26, set screw 27 being used to lock the spray nozzle in its desired position.

Air pressure from any conventional source is supplied through tube 30 having an air cut-off valve 31 therein. This tube leads to the air jet 14 through a control valve 32. A flexible branch tube 33 provided with a control valve 34 leads from the tube 30 to the spray nozzle 20.

Jar 11 and container 23 may be graduated as shown at 35 and 3[illegible] respectively. This provides a ready means for determining the proportions of water and water-incompatible material delivered into the spray, and a convenient means to regulate both the amount of the spray and the proportions of the two ingredients by regulation valves 32 and 34.

In carrying out the method, jar 11 is filled with water. The incompatible material, as, for example, DDT dissolved in a suitable water-miscible solvent, such as acetone, ethanol, isopropanol, ethylene chlorohydrin, gamma - valerolactone, mesityl oxide, dioxane, 2-butoxyethanol, morpholine, pyridine, or mixtures of them, is placed in container 23. The two sprays are operated simultaneously, the control valves being set for a desired concentration of the DDT solution in the water.

Upon drying, the DDT will remain as deposited solid particles, provided the solvent used is sufficiently volatile, or with some solvents an oily residue coating is obtained. The texture of the coating will also depend on the concentration of the DDT in the solvent, the higher concentrations giving the greater proportion of solid. With acetone, for example, concentrations of from 10 g. to 40 g. of DDT per 100 ml. of acetone may be used with satisfactory results although this range is subject to variations.

The proportions of water to the solution may be varied over wide limits. Four to seven volumes of water per volume of solution is satisfactory with acetone or alcohol solvents, but with solvents of higher viscosity, 50 to 100 volumes of water per volume of solvent may be used.

Solvents for the DDT which are immiscible with water may also be used, for example, xylene, kerosene, ligroin, soybean oil, and alkylated naphthalene solvents, or mixtures of them, or mixtures of these and water-miscible solvents. The first three mentioned are quite volatile and quickly evaporate after deposit of the film, leaving a solid residue, but the others leave an oily solution of DDT. A medium grade mineral oil solvent, which is wholly immiscible with water in the absence of emulsifiers, produces a spray which mixes with the water spray to form droplets in which the DDT solution is dispersed throughout.

Toxicants, other than DDT which are also incompatible with water may also be dispersed with the apparatus. A few toxicants which may be mentioned are acetone solutions of phenothiazine, of 2,4-dinitro-6-cyclohexylphenol, of 2-chlorofluorene, of benzene hexachloride, and of xanthone.

Adhesives may be added to the toxicant solution, even if the adhesive be incompatible with the water, and be precipitated in spray droplets along with the toxicant. DDT is itself adhesive, and requires no additional agent, but phenothiazine and 2,4-dinitro-6-cyclohexylphenol do not adhere well, to smooth surfaces at least, especially when a heavy coat is deposited. Rosin, shellac and linseed oils are examples of adhesives which may be added and placed in solution in the acetone or other solvent along with the toxicant.

Testing of the adhesive properties of deposits made according to this method, by noting the time of wash-off when subjecting a coating on a glass surface to dropping water, shows that the resistance to wash-off is far superior when deposited according to the present invention than when deposited from a single spray wherein an emulsifier or wetting agent is required. The nascent DDT with acetone solvent, when deposited according to the invention, will stand a constant drip from 18 inches height for 7 hours with no noticeable wash-off.

Having thus described the invention, what is claimed is:

1. A method of depositing DDT comprising forming a water spray, independently thereof forming a spray of a solution of DDT, and intermixing the sprays, thus causing the DDT solution to be dispersed throughout the droplets of water immediately prior to depositing of the spray.

2. The method of claim 1, wherein the solvent for the DDT is immiscible with water.

3. The method of claim 1, wherein the solvent is miscible with water, whereby a nascent precipitate of DDT is deposited.

DONALD F. STARR.

REFERENCES CITED

The following references are of record in the file of this patent:

UNITED STATES PATENTS

| Number | Name | Date |
|---|---|---|
| 327,861 | Chace | Oct. 6, 1885 |
| 817,849 | Hand | Apr. 17, 1906 |
| 905,609 | Walker | Dec. 1, 1908 |
| 1,474,655 | Urbach | Nov. 20, 1923 |
| 1,926,579 | Burgess | Sept. 12, 1933 |
| 2,143,817 | Longdin et al. | Jan. 10, 1939 |
| 2,380,827 | Downs | July 31, 1945 |